United States Patent [19]
Sullivan et al.

[11] Patent Number: 4,571,251
[45] Date of Patent: Feb. 18, 1986

[54] APPARATUS FOR PRODUCING GLASS FIBERS

[75] Inventors: Timothy A. Sullivan, Newark, Ohio; Gregory L. Morgan, Jackson, Tenn.

[73] Assignee: Owens-Corning Fiberglas Corporation, Toledo, Ohio

[21] Appl. No.: 657,109

[22] Filed: Oct. 2, 1984

[51] Int. Cl.⁴ .......................................... C03B 37/025
[52] U.S. Cl. ........................................................ 65/12
[58] Field of Search ................................... 65/1, 2, 12

[56] References Cited

U.S. PATENT DOCUMENTS

| | | | |
|---|---|---|---|
| 2,908,036 | 10/1959 | Russell | 65/12 |
| 3,328,144 | 6/1967 | Glaser | 65/12 X |
| 3,647,382 | 3/1972 | Tilbrook | 65/12 |
| 3,997,309 | 12/1976 | Harris | 65/12 |
| 4,018,586 | 4/1977 | Cates et al. | 65/2 |
| 4,330,311 | 5/1982 | Jensen | 65/1 |
| 4,332,602 | 6/1982 | Jensen | 65/12 |

*Primary Examiner*—Robert Lindsay
*Attorney, Agent, or Firm*—Ronald C. Hudgens; Greg Dziegielewski

[57] ABSTRACT

Apparatus for the production of glass filaments is provided comprising a feeder for supplying streams of molten glass to be attenuated into filaments, means for attenuating the streams into filaments and an environmental control means adapted to remove heat from the fiber forming region comprised of a plurality of fin-like members positioned between the streams of molten glass being attenuated into filaments, the first end of said members being permanently secured to a first cooling manifold and the second end of said members being releasably positioned within notches in a second manifold.

5 Claims, 3 Drawing Figures

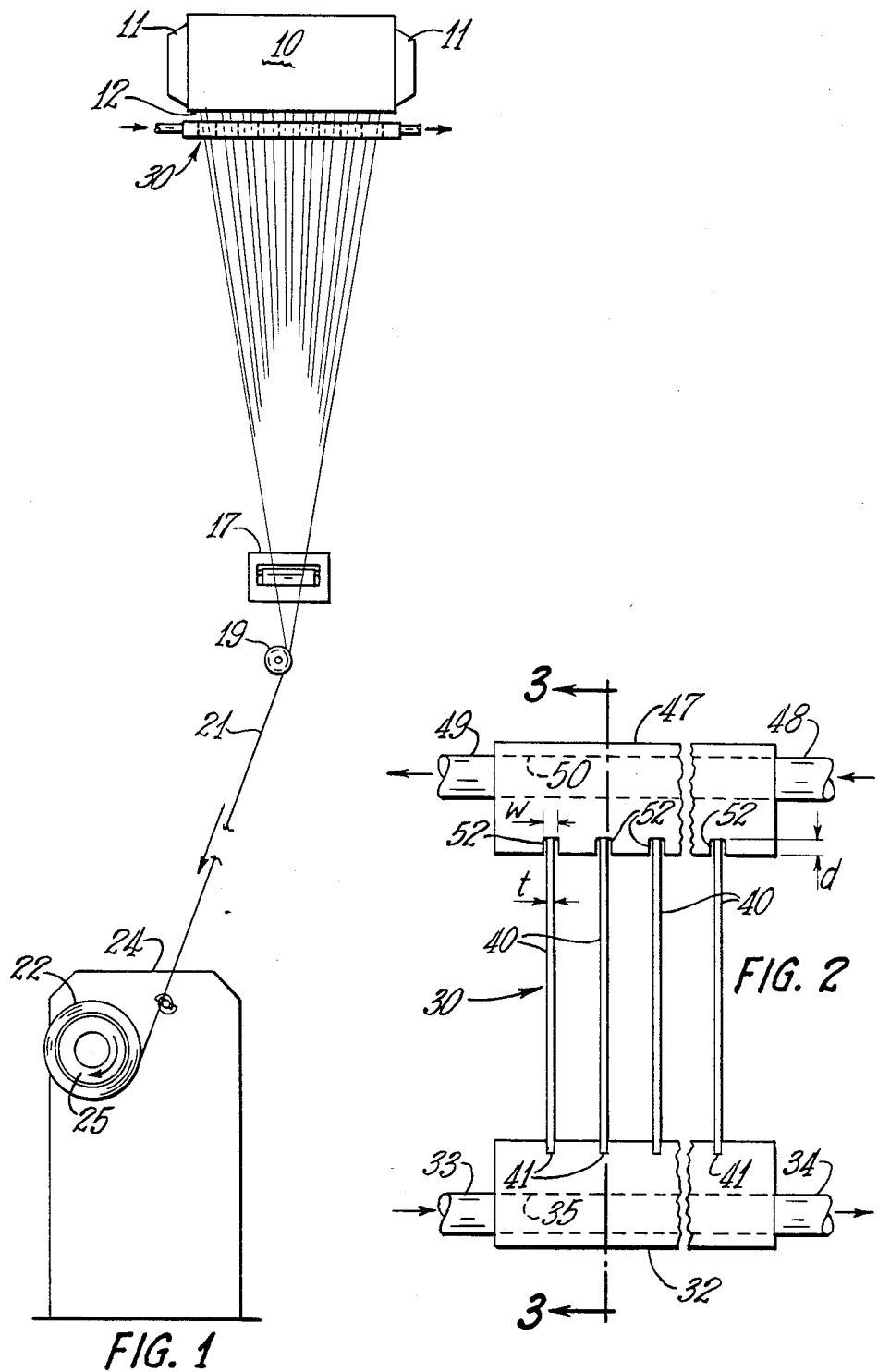

APPARATUS FOR PRODUCING GLASS FIBERS

TECHNICAL FIELD

The invention disclosed herein relates to an improved environmental control means for removing heat from the zone of attenuation in the production of glass fibers.

BACKGROUND

The use of an environmental control means comprised of a plurality of fin-like members secured to a water-cooled manifold is well-known in the art. For example, see U.S. Pat. No. 2,908,036 issued to Robert G. Russell. The Russell patent discloses that the fin-like members may be cantilevered from one water-cooled manifold, a "single-manifold" system, or may be secured at each end to a pair of such manifolds, a "dual manifold" system.

When operating the "single manifold" fin system, the temperature of the fin at the distal end is generally greater than the temperature of the fin near the manifold. Notwithstanding the more severe temperature gradient or differential across the length of the fin, the "single manifold" fin system has been much more widely used than the known "dual manifold" type of fin system wherein the fins are permanently attached to individual cooling manifolds at each end.

The "single manifold" system is much more broadly utilized because of the difficulties in replacing and/or maintaining the permanently attached "dual-type" fin systems as compared to the "single manifold" fin systems.

The present invention provides a system wherein the reduced temperature gradient is provided with a pair of water-cooled manifolds but without the associated problems of previous "dual manifold" cooling systems.

DISCLOSURE OF THE INVENTION

This invention pertains to cooling system apparatus associated with glass fiber forming systems wherein fin-like cooling members are permanently secured to a first manifold at one end and are slidably positioned within notches or grooves of a second cooling manifold at the opposite end.

BRIEF DESCRIPTION OF THE DRAWINGS

FIG. 1 is a semi-schematic elevational view of a fiber forming position employing the environmental control means according to the principles of this invention.

FIG. 2 is a plan view of the environmental control means according to the principles of this invention.

BEST MODE OF CARRYING OUT THE INVENTION

Figure 3:
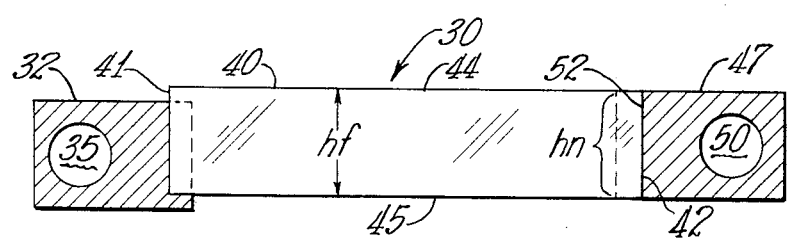
FIG. 3 is a sectional view of the environmental control means shown in FIG. 2 taken along view 3—3.

As shown in the drawings, orificed discharge wall 12 of feeder 10 is adapted to supply a plurality of molten glass streams to be attenuated into a plurality of filaments 15. Feeder 10 includes a pair of terminals 11 which are adapted to be connected to a source of electrical energy (not shown) to resistively heat feeder 10, as is known in the art.

As shown in FIG. 1, the streams of molten inorganic material, such as glass, are drawn into filaments 15 through the action of winder 24. However, it is to be understood that any other suitable attenuative system may be employed in the place of winder 24.

As is known in the art, coating applicator 17 applies a protective coating or sizing material to the advancing filaments 15, and gathering means or shoe 19 collects the filaments 15 into a strand 21 which is wound into a package 22 on the rotating collet 25 of winder 24.

As shown in FIGS. 2 and 3, environmental control means 30 is comprised of a first manifold 32, a second manifold 47 and a plurality of fin-like members 40 extending therebetween and is positioned at the zone filament attenuation to cool the streams of molten glass to facilitate the formation of filaments. As such, the fin-like members extend between the streams of molten glass and filaments, as is known in the art.

According to the principles of this invention, the first end 41 of fin-like members 40 is permanently secured to a side of first manifold 32 by any suitable means such as soldering or welding as is known in the art, and the second end 42 of each fin-like member 40 is positioned within one of the plurality of notches 52 in second manifold 47. As such, the ends 42 of fin-like members 40 are merely in contact with second manifold 47 within the notches or grooves 52 therein rather than being permanently secured thereto.

This permits the fin-like members to be replaced, adjusted or maintained without disrupting or breaking the glass streams or filaments being produced which would be impossible to do if fin-like members 40 were permanently secured to both the first manifold 32 and second manifold 47. Yet, such "contact" with the second manifold 47 increases the rate of heat transfer out of the fiber forming zone through the fins 40 and reduces the temperature differential over the length of the fin, as compared to a "single manifold" system.

First manifold 32 includes an inlet 33 and an outlet 34 to supply cavity 35 with a flow of cooling fluid, such as water, as is known in the art. Similarly, second manifold 97 includes an inlet 48 and an outlet 49 to supply cavity 50 with a flow of water. Manifolds 32 and 47 may be connected in series or in parallel with respect to the water flow according to the principles of this invention, but it is desirable that each manifold be connected to its own source of cooling water with the flow of water being in opposite directions as shown in FIG. 2. Generally, such manifolds are positioned to extend along the length or width of the fiber forming zone.

To permit the fin-like member 40 to be easily inserted in notches 52 of second manifold 47, it is desirable that the width "w" of each notch 52 be greater than or equal to 1.5 times the thickness "t" of member 40. Preferably, the width "w" of notch 52 is about twice the thickness "t" of member 40.

As can be seen in FIG. 3, the height "$h_f$" of fin-like member 40 is substantially equal to the height "$h_n$" of notch 52 as well as manifolds 32 and 47.

As shown, the upper edge 44 and lower edge 45 of fin-like member 40 is substantially flush with the upper and lower surface of second manifold 47. That is, the second end 42 of fin-like member 40 is located totally within the notch 52 of second manifold 47 for the most effective transfer of heat from member 40 to manifold 47; however other arrangements are possible.

For ease of mounting, the first end 41 of fin-like member 40 is positioned slightly offset with regard to first manifold 32. It is to be understood, however, that other arrangements, such as flush mounting for the first end, are within the scope of the instant invention. Environmental control means 30, especially fins 40, should not contact the metal of feeder 10.

As shown, the depth "d" of notch 52 is approximately equal to the width "w" of notch 52. As such, the depth "d" of notch 52 is relatively shallow.

However, it is to be understood that the cooling system disclosed herein is preferably configured according to the principles set forth in concurrently filed patent application Ser. No. 657,109, filed on Oct. 2, 1984 in the names of Timothy A. Sullivan, Gregory L. Morgan and Arthur S. Warner which is hereby incorporated by reference.

Thus, according to the principles of this invention, the temperature gradient along the length of each fin-like member 40 is substantially similar to previous "permanently attached dual manifold" fin system and yet provides for ease of replacement and maintenance heretofore not possible with such "dual manifold" systems. The contact by second end 42 with second manifold 47 substantially reduces the temperature of the fin-like member at that point as compared to a "single manifold" system, especially with wide fiber forming feeders. The reduced temperature gradient or differential over the length of the fin is important in achieving satisfactory performance in the production of glass fibers.

It is apparent that, within the scope of the invention, modifications and different arrangements can be made other than as herein disclosed. The present disclosure is merely illustrative with the invention comprehending all variations thereof.

INDUSTIAL APPLICABILITY

The invention described herein is readily applicable to the glass fiber industry.

We claim:

1. Apparatus for producing continuous glass filaments comprising
   a feeder for supplying streams of molten glass to be attenuated into filaments,
   means for attenuating the streams into continuous filaments, and
   an environmental control means adapted to remove heat from the fiber forming region comprised of a plurality of fin-like members positioned between the streams of molten glass being attenuated into filaments, the first end of said members being permanently secured to a first manifold adapted to flow cooling fluid therethrough and the second end of said members being in contact with a second manifold adapted to flow cooling fluid therethrough, said fin-like members being slidably positioned within notches in said second manifold to permit the fin-like members and first manifold to be replaced in the absence of breaking the continuous filaments.

2. The apparatus of claim 1 wherein the width of said notches is at least 1.5 times the thickness of one of the fin-like members.

3. The apparatus of claim 1 wherein the width of said notches is about twice the thickness of one of said fin-like members.

4. The apparatus of claim 2 wherein the depth of said notches is approximately equal to the width of said notches.

5. The apparatus of claim 1 wherein the height of the fin-like members is substantially equal to the height of said notches.

* * * * *